United States Patent
Dawson

(10) Patent No.: US 6,618,500 B1
(45) Date of Patent: Sep. 9, 2003

(54) COLOR CONVERSION MATRIX BASED ON MINIMAL SURFACE THEORY

(75) Inventor: Thomas P. Dawson, Escondido, CA (US)

(73) Assignees: Sony Corporation, Tokyo (JP); Sony Electronics Inc., Park Ridge, NJ (US)

(*) Notice: Subject to any disclaimer, the term of this patent is extended or adjusted under 35 U.S.C. 154(b) by 0 days.

(21) Appl. No.: 09/456,143

(22) Filed: Dec. 7, 1999

(51) Int. Cl.$^7$ .................................................. G06K 9/00
(52) U.S. Cl. ........................................ 382/162; 345/604
(58) Field of Search ................................ 362/162–167; 358/518–540; 345/589–606

(56) References Cited

U.S. PATENT DOCUMENTS

| | | | | |
|---|---|---|---|---|
| 4,169,285 A | * | 9/1979 | Walker | 345/591 |
| 4,907,075 A | | 3/1990 | Braudaway | 358/75 |
| 5,049,986 A | | 9/1991 | Aono et al. | 358/80 |
| 5,365,252 A | | 11/1994 | Lo | 345/153 |
| 5,394,518 A | | 2/1995 | Friedman et al. | 395/131 |
| 5,398,120 A | | 3/1995 | Friedman et al. | 358/501 |
| 5,463,702 A | | 10/1995 | Trueblood | 382/239 |
| 5,485,558 A | * | 1/1996 | Weise et al. | 345/597 |
| 5,638,190 A | | 6/1997 | Geist | 358/500 |
| 5,734,368 A | * | 3/1998 | Meyers et al. | 345/593 |
| 5,748,771 A | * | 5/1998 | Fujiwara | 382/162 |
| 5,793,892 A | | 8/1998 | Pan et al. | 382/232 |
| 5,877,754 A | * | 3/1999 | Keith et al. | 345/601 |
| 6,181,818 B1 | * | 1/2001 | Sato et al. | 382/170 |
| 6,456,300 B1 | * | 9/2002 | Pettigrew | 345/634 |

FOREIGN PATENT DOCUMENTS

| | | | | |
|---|---|---|---|---|
| JP | 02 194773 | 8/1990 | | H04N/1/46 |
| JP | 08 286651 | 11/1996 | | G09G/5/06 |

OTHER PUBLICATIONS

Sakauchi, M. et al.: "A flexible and high–speed color image quantization using a 3–D pattern data structure" Applications of Digital Image Processing XII, San Diego, CA USA, Aug. 8–11, 1989, vol. 1153, pp. 640–644, XP000998242, Proceedings of the SPIE—The International Society for Optical Engineering, 1989, USA, ISSN: 0277–786X.

Ashdown, A., "Octree Color Quantization", Copyright 1994 John Wiley & Sons, Inc., pp. 1–7.

* cited by examiner

Primary Examiner—Jingge Wu
(74) Attorney, Agent, or Firm—Mayer Fortkort & Williams, PC; Karin L. Williams, Esq.

(57) ABSTRACT

A method for color conversion applying minimal surface theory to the formation of the volumes in a three-dimensional color cube. Volume center points on the color cube are selected as entries in a color look-up table, and these center points are plotted on the color cube. Spheres centered about each volume center point are created, and the discrete locations in the color cube falling within each sphere are associated with the CLUT entry corresponding to that volume center point. The radii of the spheres are incrementally increased, and the discrete locations falling within the enlarged spheres are associated with the corresponding CLUT entry. As the spheres enlarge they begin to intersect. The intersection of the spheres form planes which divide the discrete locations such that each discrete location is associated with the closest volume center point.

17 Claims, 7 Drawing Sheets

| Discrete Location | Mapping Value (Upper byte) | Bit Flags (Lower byte) |
|---|---|---|
| (0, 0, 0) | | |
| (0, 0, 1) | | |
| (0, 0, 2) | | |
| . | | |
| . | | |
| . | | |
| (0, 0, 255) | | |
| (0, 1, 0) | | |
| (0, 1, 1) | | |
| (0, 1, 2) | | |
| . | | |
| . | | |
| . | | |
| (0, 1, 255) | | |
| (0, 2, 0) | | |
| (0, 2, 1) | | |
| (0, 2, 2) | | |
| . | | |
| . | | |
| . | | |
| (0, 2, 255) | | |
| . | | |
| . | | |
| . | | |
| (255, 255, 255) | | |

FIG. 3a

| Mapping Value | Display Color |
|---|---|
| 0 | |
| 1 | |
| 2 | |
| 3 | |
| . | |
| . | |
| 255 | |

FIG. 3b

COLOR CONVERSION MATRIX BASED ON MINIMAL SURFACE THEORY

BACKGROUND

1. Field of the Invention

This invention relates to digital image processing and display. More particularly, this invention relates to the quantization of digital color images.

2. Description of Related Art

Raster images are typically composed of a plurality of individual pixels, each pixel having a particular color and location associated with it. The color of the pixel can be expressed in terms of the intensities of three color variables in a color model. Representative color model systems include RGB (red, green, and blue), CMY (cyan, magenta, and yellow), YIQ ("Y" representing luminance and "I" and "Q" representing chromaticity), HSV (hue, saturation, and value), also known as HSB (hue, saturation, and brightness), and HLS (hue, lightness, and saturation).

Using the RGB color model as an example, by defining colors in terms of their red, green, and blue components, all of the colors in the spectrum can be represented as points in a three-dimensional color cube, each axis representing one of the three primary colors. The intensity of each color component is normalized to a value between zero and one, zero indicating the complete absence of that component and one indicating full saturation. In a 24-bit true color image, the intensity for each RGB component is stored as an eight bit value, which provides 256 different intensity levels for each primary color, for a total of $2^{24}$ (over 16 million) colors. Each of these unique colors can be plotted as discrete locations on the three-dimensional color cube.

It is often desirable to reduce the total number of colors in an image in a process known as color quantization, which enables the color information from a true color image to be conveyed with fewer bits than that used for the original image. In a typical quantization, all of the colors in a true color image are mapped to a color palette, or color look up table (CLUT), wherein each of the $2^{24}$ unique colors are mapped to one of the colors in the CLUT. In one form, the CLUT includes 256 unique colors. Using such a color palette, the CLUT's 256 colors are indexed using integer numbers ranging from zero to 255. All of the colors actually present within a true color image are mapped to one of the 256 colors in the CLUT, which allows the colors from the true color image to be stored using only eight bits per pixel. While some color resolution may be lost during the quantization process, careful selection of the colors to be represented in the palette can minimize the impact on final image quality. For example, an analysis of the colors present in an image can be used to create an adaptive palette, which is a palette for which the selected colors to be used for quantization of an image are tuned to that particular image.

One method for selecting the colors in the CLUT is known as the popularity algorithm. This method determines which colors that appear most often in the image, and these colors are chosen as the entries for the CLUT. After the CLUT entries are chosen, each of the unique colors in the original image is mapped to one of the colors selected as a CLUT color entry. Ideally, each unique color should be mapped to the CLUT entry nearest to that unique color on the three-dimensional color cube, which would provide the closest approximation of that unique color. However, computing the absolute Cartesian distances between each unique color as mapped on the color cube and each of the CLUT entries for each individual pixel requires significant computational processing and large amounts of memory. There has not heretofore been proposed an efficient method for mapping pixels to the nearest CLUT entry.

To determine which CLUT entry to associate with each pixel, a method known as the median-cut algorithm has been used. Using this method, the three-dimensional color cube is divided such that each CLUT color entry represents an equal number of pixels in the image. This is accomplished by creating a histogram of color values for each axis, and dividing the cube at the centers of this histogram using a plane orthogonal to that axis such that equal numbers of pixels remain on either side of the plane. This process is repeated for each axis until the color cube is divided into enough volumes to fill the CLUT. A CLUT entry is then assigned to each volume by computing the average of all the pixel values in that volume. Then, when quantizing the image, each pixel is mapped to the CLUT entry for the volume in which that pixel is located, thus approximating the closest CLUT entry for each pixel.

This approximation significantly reduces the processing that would be needed if absolute distances were determined for each pixel. However, because of the use of dividing planes orthogonal to the axes, the volumes associated with each CLUT entry are shaped in the form of a parallelepiped. Thus, pixels located in the outer corners of the volumes may in fact be closer to a CLUT entry corresponding to an adjacent volume, resulting in a less accurate color quantization. Another limitation of this approach is that the dividing planes are only formed orthogonal to one of the three axes. In an actual image, the concentration of pixel locations do not necessarily align perfectly with these axes. It has been proposed to analyze the densities of pixel locations in the color cube, and to rotate the axes so that the sides of the volumes better align with the layout of the pixels. Although this provides some improvement, it does not overcome the fundamental problem associated with dividing the color cube into volumes having sides which are all aligned in the same directions.

Thus, a disadvantage of the existing algorithms for color quantization is that they fail to effectively map the original image pixels to the selected CLUT entries. It is far too processor-intensive to determine the absolute distances between each discrete location and the CLUT entries on the color cube in order to identify the closest CLUT entry. On the other hand, using only the rough geometric approximation of the median-cut algorithm requires less computation, but may result in inferior image quality. Accordingly, there is a need for an improved color conversion method which minimizes the computational loads while accurately preserving the original image quality.

SUMMARY

To perform a color conversion, all of the colors in an image are represented by a smaller number of color entries in a color look-up table (CLUT). In accordance with the present invention, minimal surface theory is applied to the formation of spherical volumes in a color cube. The number of spherical volumes and the corresponding number of colors selected is a function of the desired amount of color compression. A sphere-creating process is then performed in which spheres centered on the center of each volume are created having a radius R. All of the pixels falling within a sphere are identified and associated with the volume center point about which that particular sphere is centered. Each sphere has attributed to it the color of a CLUT entry corresponding to the color of the sphere's center point. The radii of the spheres are incrementally increased, and all of the pixels falling within the enlarged spheres are associated with the corresponding CLUT entry.

The process of enlarging the spheres and associating additional pixels is repeated. As these spheres increase in size, they will begin to intersect and overlap with adjacent spheres. Because each location in the color cube must be associated with exactly one CLUT entry, the locations located within an overlapping region should be associated with the closest volume center point. Minimal surface theory teaches that the minimum distance between two points is a plane. Thus, as the surfaces of the expanding spheres approach and intersect adjacent spheres, planes will form between the spheres, and these planes are used to demarcate borders of the volumes associated with each volume center point. Unlike prior art methods, these planes will not necessarily form parallel to one of the sides of the color cube or orthogonal to the other sides of the volume. Instead, the orientation of the planes more accurately associate each point in the color cube with the closest center point. The sphere-creating process is repeated until all of the locations in the color cube have an associated CLUT entry. Using the foregoing process defines the data to be written into a CLUT and to map a color image, a 24-bit true color image, for example, into a CLUT.

BRIEF DESCRIPTION OF THE DRAWINGS

FIG. 3a is a table illustrating a three-dimensional array in accordance with the present invention.

FIG. 3b illustrates a color look-up table in accordance with the present invention.

Use of the same reference symbols in different figures indicates similar or identical items.

DETAILED DESCRIPTION OF THE PREFERRED EMBODIMENTS

Figure 1:
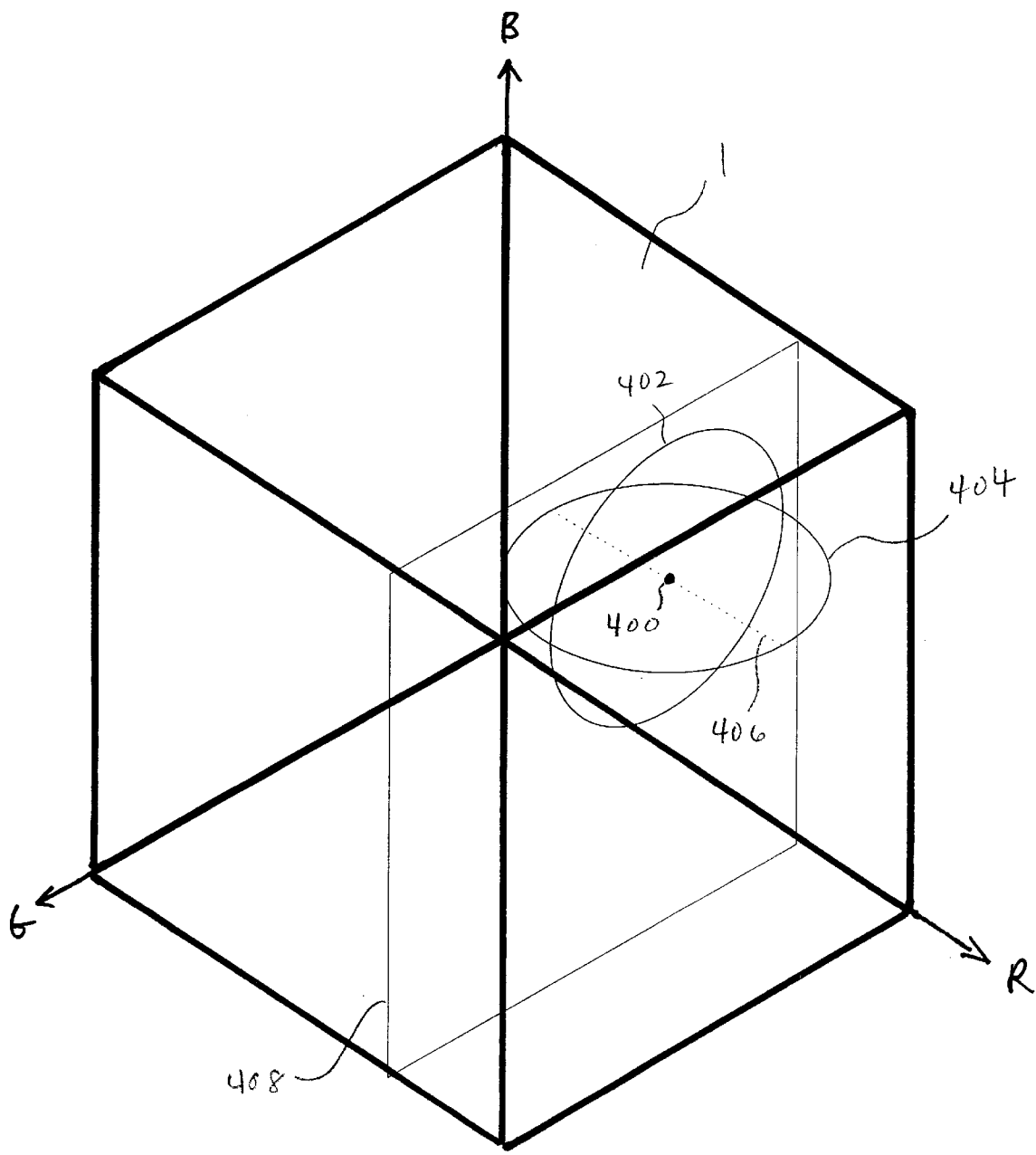
FIG. 1 shows a three-dimensional color cube for illustrating a color conversion method in accordance with the present invention.

The pixels from a digital image are plotted on a three-dimensional color cube 1, each axis of color cube 1 representing a variable in a color model, such as the red, green, and blue (RGB) axes shown in FIG. 1. Although the following embodiment utilizes the RGB color model, it will be understood that any color model may be used. The color components for each pixel of the digital image are stored as true color values, wherein the color components for each pixel are located along each of the three axes. For the case of 24-bit true color, eight bits are used to identify each pixel's color component location along each axis, and each axis is divided into increments numbered 0–255, thus dividing the entire cube into $2^{24}$ discrete cubic locations.

The color cube is divided into a plurality of volumes to determine the associations between the discrete locations and the entries in a color look-up table (CLUT). Although any number of volumes could be selected, it has been found that 256 volumes provide good color rendition while requiring only an 8-bit value. After the 256 colors for the entries in the CLUT are determined, these 256 colors are plotted on the three-dimensional color cube as 256 unique center points. It will also be understood that any color conversion ratio may be used, and the conversion from 24-bit true color to an 8-bit CLUT value is for exemplary purposes only.

Any of a number of well-known methods can be used for selecting the colors to be used as the CLUT entries for this image. In accordance with the present invention, a sphere-creating process is performed for associating all of the discrete locations in the color cube with one of the volume center points, wherein the color of each center point is selected as a CLUT entry. A sphere centered about each center point is created, and all of the discrete locations falling within that sphere are associated with the CLUT entry corresponding to its center point. The radius of each sphere is then increased by one increment and the association process is repeated. At a certain point, the surfaces of these spheres will begin to intersect the surfaces of adjacent spheres. Each discrete location is associated with exactly one center point, and once the association is established, that association is not overwritten. Thus, as the spheres continue to grow and overlap, the overlapping portions are not considered when associating additional discrete locations.

As understood from minimal surface theory, the smallest interface between two spheres is a plane. Thus, as two spheres from adjacent volume center points increase in size and begin to intersect, the intersection forms a plane orthogonal to the line connecting the two center points. By using that plane to determine the proper CLUT association, this method more accurately associates each discrete location with the closest center point. Unlike other methods of CLUT association which create parallelepiped-shaped volumes having sides which are parallel to the axes of the color cube, the color conversion process in accordance with this aspect of the present invention creates volumes whose borders may be located in any orientation to more accurately associate the discrete locations with the closest center points.

The formation of the spheres can be performed using a variation of conventional circle forming algorithms, which are often used to create circles and curves in a bitmap image or for raster display. Incremental methods and integer arithmetic are used to minimize the number of calculations to be performed and to eliminate the need for floating-point calculations. While the sphere creation is performed in three-dimensions, the two-dimensional circle creation illustrated in FIGS. 2a–2f will be discussed first.

Figure 2A:
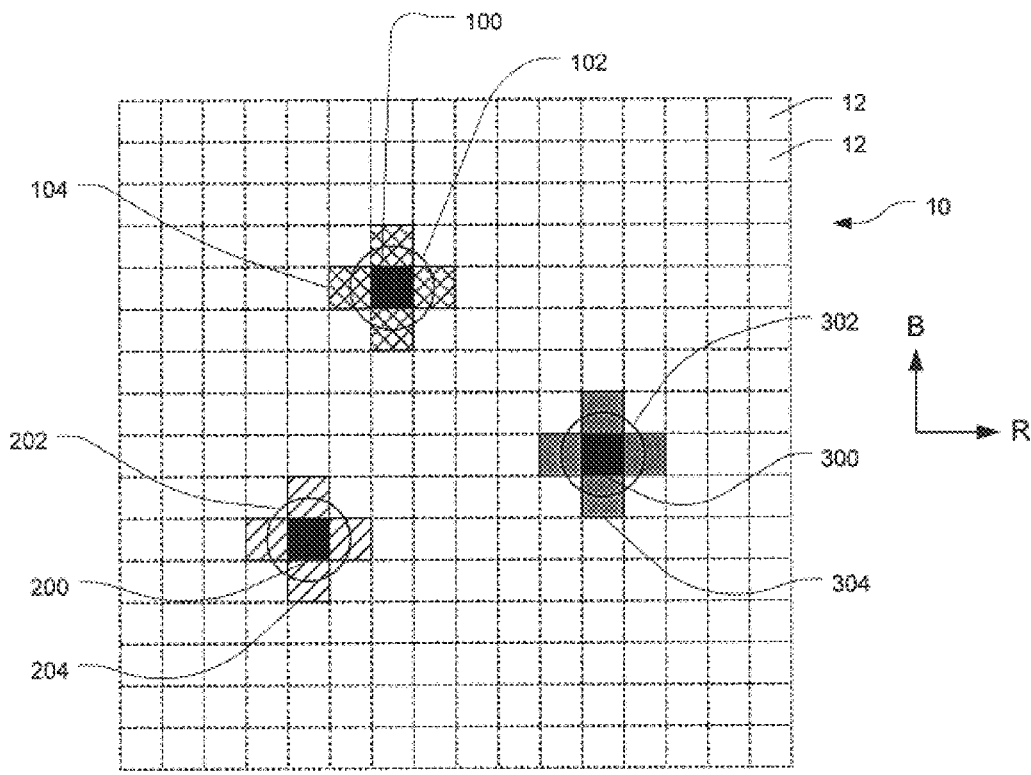
FIGS. 2a–2f show via two-dimensional circle-creating steps the process of associating pixels with volume center points in accordance with the present invention.

FIG. 2a illustrates a two-dimensional array 10 of discrete locations 12, wherein each discrete location 12 represents a location on the three-dimensional color cube and array 10 represents a portion of a plane of the color cube in the B-R direction. Volume center points 100, 200, and 300 are located within array 10. Note that FIGS. 2a–2f are for exemplary purposes, and that in practice the center points may not necessarily fall in the same plane and may not be so closely spaced. All other discrete locations 12 in array 10 are provided with a default setting indicating that they have not yet been associated with any center points. This is shown in FIGS. 2a–2f by the absence of shading in each location 12. When implemented on a computer system, each location in the color cube may be associated with CLUT mapping value, in which the default value is "minus one", and after the location is associated with an center point, the value may be switched to a CLUT value. To associate a location with a center point, the CLUT value corresponding to that center point is stored as the CLUT mapping value for that location.

When all of the locations contain an associated CLUT value, the color cube mapping is complete.

An array of one-bit values can be used as an alternative method for monitoring the associations of discrete locations 12. This array contains a default value of "0" for each discrete location 12 in the color cube. As each location 12 is associated with a CLUT mapping value, the value corresponding to that discrete location 12 is changed to "one." This array therefore provides a simple method for monitoring the associations.

Around each center point 100, 200, 300 circles 102, 202, 302 are formed. Circles 102, 202, 302 are centered about each of the volume center points 100, 200, 300 and have a radius of one unit equal to the width of one discrete location 12. Circles 102, 202, 302 are formed using any of a number of well-known circle forming algorithms for displaying arcs or circles on raster displays. Exemplary methods are described in *Computer Graphics: Principles and Practice*, James D. Foley et al. (Addison-Wesley Publishing Company 1996), which is incorporated herein by reference in its entirety.

In FIGS. 2a–2f, as the circles 102, 202, 302 are drawn around center points 100, 200, 300, and all of the locations 12 contained within these circles 102, 202, 302 are associated with the appropriate center point 100, 200, 300. Various methodologies may be used for determining whether a location 12 falls "within" a circle. In the embodiment shown in FIGS. 2a–2f, any location 12 whose center point falls either on or within the border of a given circle is marked as falling "within" that circle. An alternative method would identify any location 12 whose volume falls more than 50% within the border of a given circle as being "within" that circle.

In FIG. 2a, the border of circle 102 crosses through the center points of four adjacent locations 12, and these are marked as associated locations 104. Associated locations 204 and 304 are also shaded to indicate that they fall within circles 202 and 302, and are associated with volume center points 200 and 300, respectively.

Figure 2B:
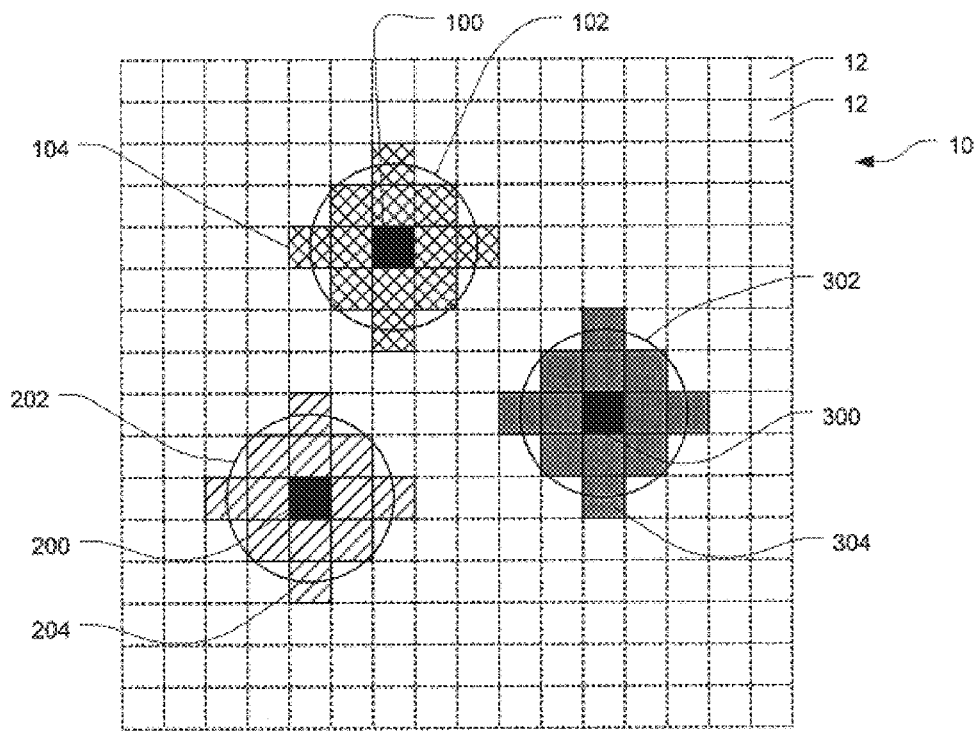

In FIG. 2b, the radii of circles 102, 202, 302 are increased by an increment equal to the width of one discrete location 12. All of the discrete locations 12 located within these newly enlarged circles 102, 202, 302 are identified and checked to determine whether they have already been associated with another volume center point. The eight additional locations 12 surrounding volume center point 100 that have not already been associated in FIG. 2a are marked as associated locations 104, and the 24-bit colors represented by those locations 104 are mapped to, or associated with, the color represented by center point 100. The same process is performed on the eight additional locations 204 located within circle 202 and the eight additional locations 304 located within circle 302.

Figure 2C:
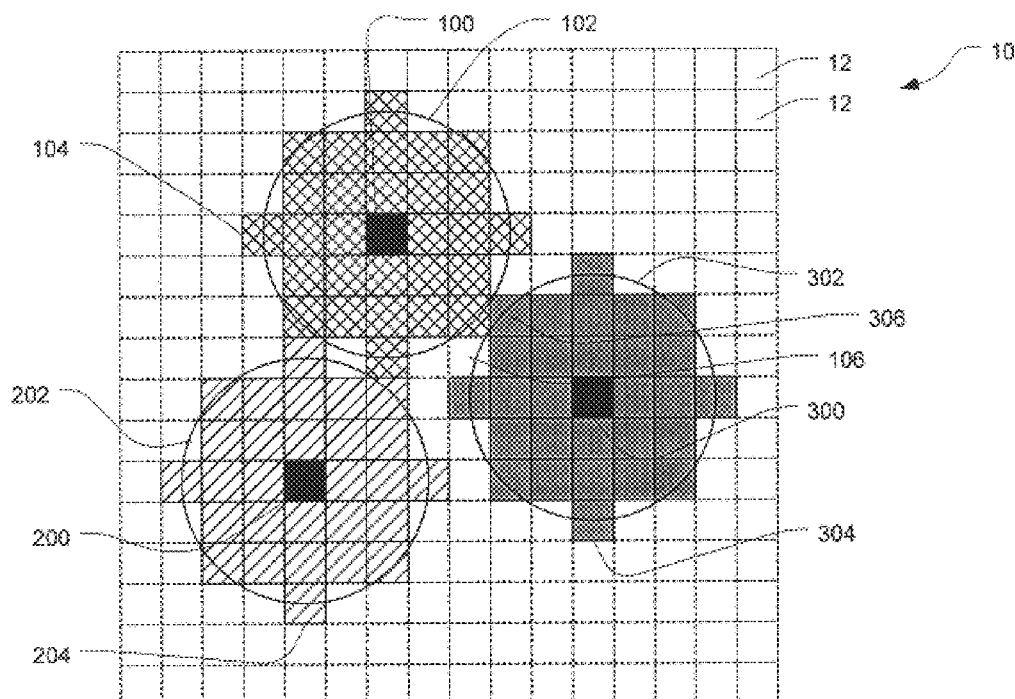
Figure 2D:
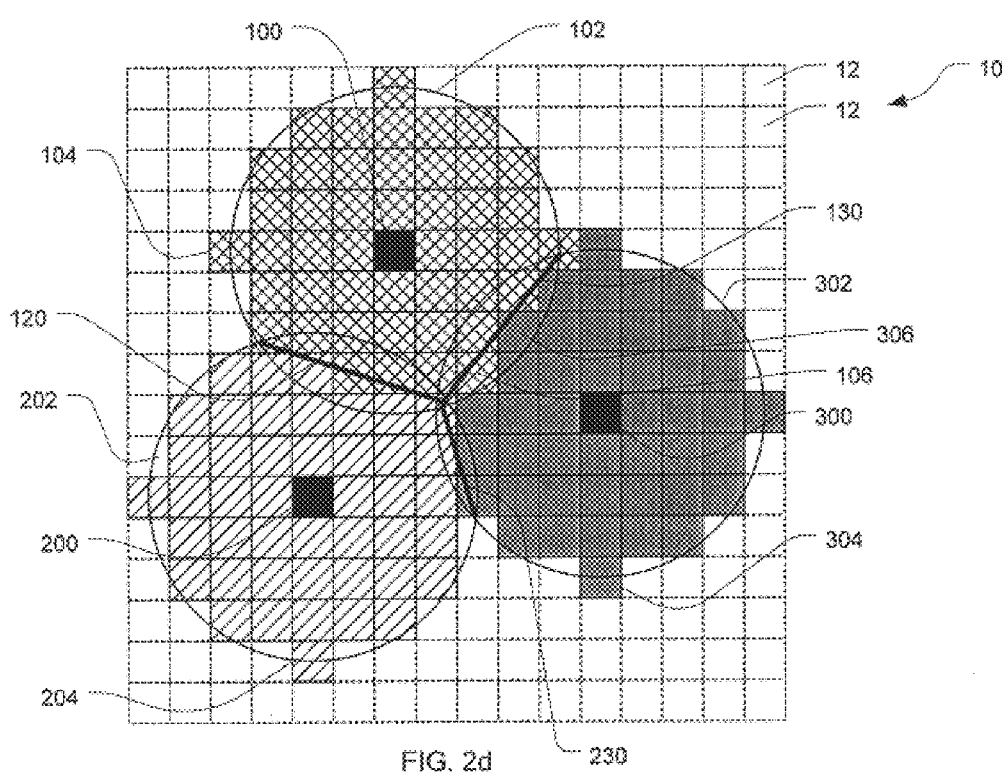

The radii of circles 102, 202, 302 are again incrementally increased by one unit, and the location association process is repeated, as shown in FIG. 2c. In FIG. 2d, the radii of circles 102, 202, 302 are increased another unit. At this point, circles 102, 202, 302 begin to overlap. Looking specifically at the overlap between circles 102 and 302, a theoretical line 130 is formed between center point 100 and center point 300. This theoretical line 130 is a line equidistant at all points to both center point 100 and center point 300, and using the method according to the present invention, the associations of discrete locations 12 with center point 100 and center point 300 will be demarcated by this line. Similar theoretical lines 120, 230 are formed at the interface between circles 102 and 302 and circles 202 and 302, respectively. As can be seen in FIG. 2d, these lines, which represent the proper division between the CLUT value associations, are not parallel to either axis in array 10. Had these lines been approximated using lines parallel to these axes, the resulting image color quality may degrade.

Looking closely at discrete location 306, one can see that location 306 falls within circle 102, yet is marked as a member of group 304, indicating that location 306 is associated with the CLUT value corresponding to center point 300. This is because in the previous association step shown in FIG. 2c, location 306 had already been associated with the CLUT value corresponding to center point 300. This association is carried over to later iterations of the circle-creating process.

Location 106 presents a different situation. In the previous step shown in FIG. 2c, location 106 remained unassociated with any CLUT value. In the following step, location 106 fell within both circle 102 and circle 302. The association for location 106 can be determined by following the order of circle processing. Although in each iteration of the circle-creating process, the radii of all of the circles in array 10 are incrementally increased, the calculation and processing for each circle takes place sequentially. Thus, although each iteration shown in FIGS. 2a–2f involves the incremental increase in all three circles 102, 202, 302, when the circle-creating calculation is performed on a computer, these circles are processed serially, the radius of circle 102 being increased first and the new discrete locations 12 falling within the enlarged circle 102 are associated with center point 100. This is then followed by an increase in the radii of circle 202 and then circle 302. Thus, the discrete locations 12 are preferentially associated with center point 100 over center points 200 and 300. For this reason, location 106 becomes a member of group 104 and is associated with center point 100 first. Once this association is established, location 106 does not become re-associated if it later falls within other circles.

As illustrated by the mapping of location 106 in FIG. 2d, the determination of the order in which the circles are processed may alter the CLUT value associations, and may thus impact the quality of the image. Various methods can be used for determining the order in the spheres are created and processed. In one embodiment, the center points are processed in the order they appear in the CLUT, without regard for the particular colors represented. In another embodiment, the center points may be ordered such that those with the highest histogram counts are processed first. Other methodologies include ordering the center points from brightest to darkest or starting with the center points closet to the center of the color cube and proceeding with the center points increasingly farther from the center.

Figure 2E:
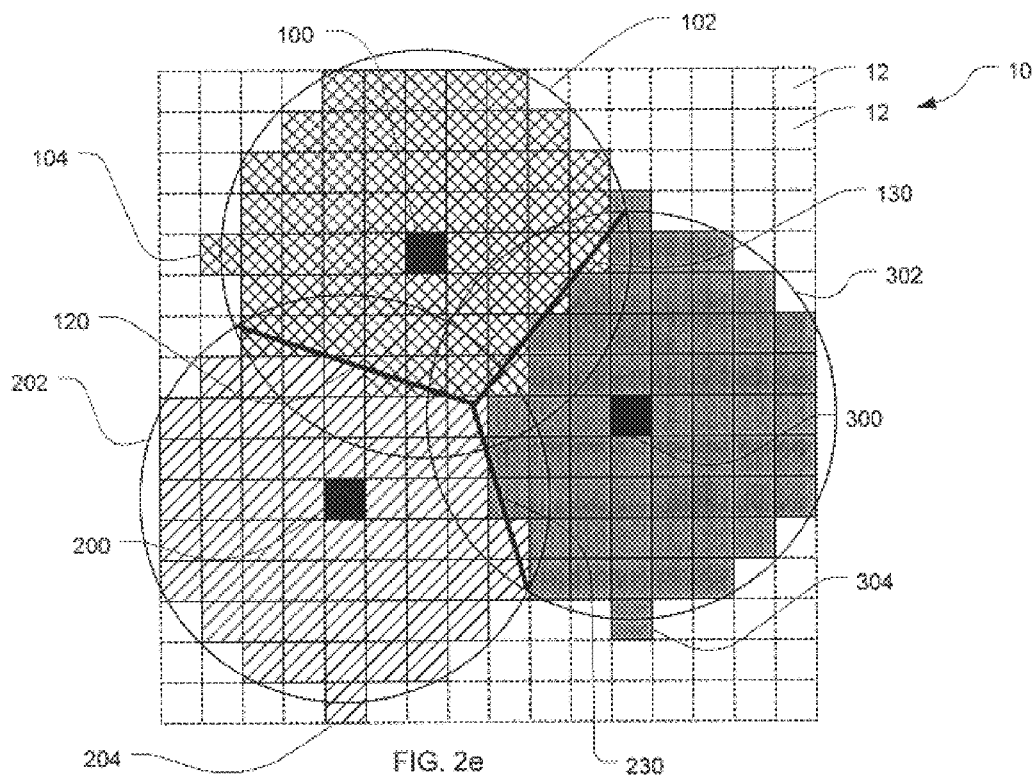
Figure 2F:
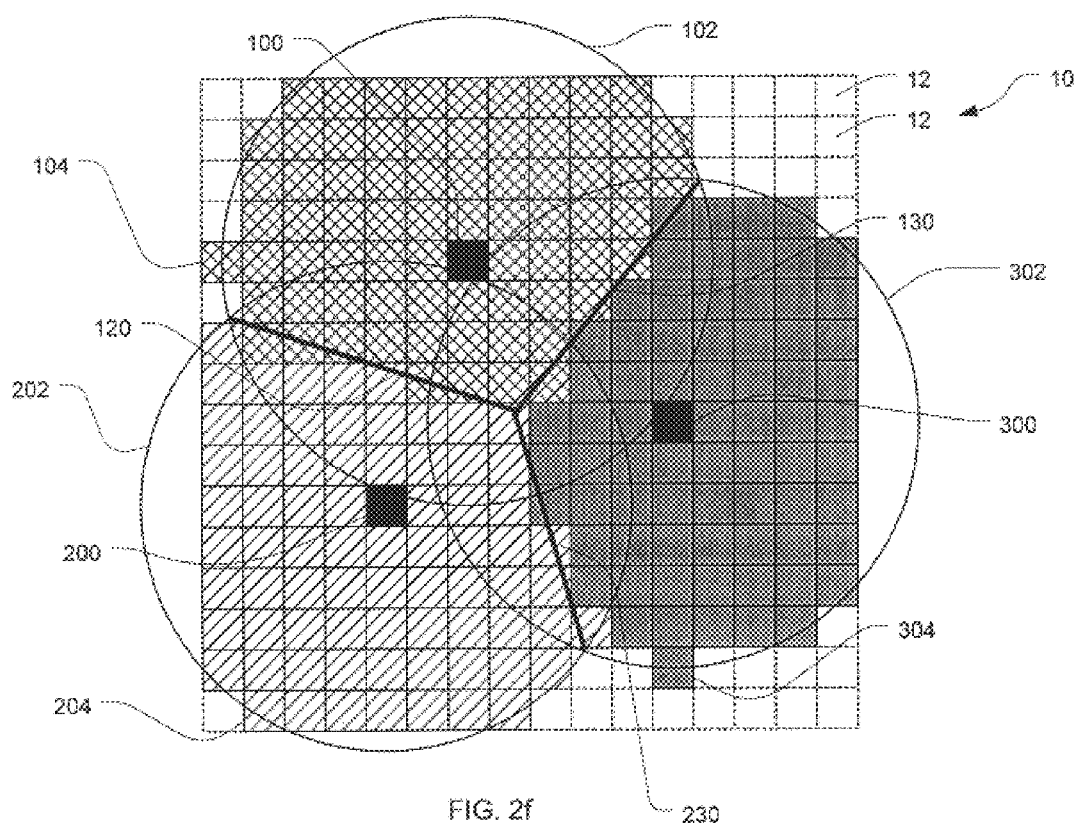

FIGS. 2e–2f illustrate successive iterations of the circle-creating process. This process is repeated until all discrete locations 12 are associated with exactly one CLUT value.

The circle-creating process illustrated in FIGS. 2a–2f is a two-dimensional part of the overall sphere-creating process in accordance with the present invention. FIG. 1 shows a volume center point 400 plotted in color cube 1. Circle 402 centered about center point 400 is formed in plane 408, as described above with respect to FIGS. 2a–2f. Plane 408 is a plane in color cube I parallel to the B-G plane. A corresponding circle 404, also centered about center point 400, is formed parallel to the G-R plane with a radius equal to the radius of circle 402. The discrete locations 12 falling within circle 402 are processed in the B-G plane and associated with center point 400 as described above. To create a sphere about center point 400, multiple layers of circles are formed in parallel planes, each circle being centered about an axis parallel to one of the primary RGB axes, as will be described below.

In FIG. 1, axis 406 is parallel to the R-axis and passes through center point 400. Multiple layers of circles centered on axis 406 and parallel to circle 402 are created, each layer being separated from adjacent layers by one unit. Each circle on layers on either side of circle 404 has an increasingly smaller radius determined by circle 402. By repeatedly performing the circle-creation process, a sphere centered about center point 400 is effectively created using well-known circle drawing methods. For simplicity, only one center point 400 is shown in FIG. 1. It will be understood that in practice, the color cube will be filed with a plurality of volume center points. As the spheres around the center points enlarge, the circles forming the spheres will begin to intersect and form planes similar to lines 120, 130, 230 in FIGS. 2d–2f. As taught by minimal surface theory, these planes will form the minimal intersection between the spheres. Because these circle-drawing methods use simple integer calculations, the amount of processing required for creating each sphere is minimal. However, this process advantageously creates volumes in a color cube whose sides more precisely associate the discrete locations with the closest center points.

The order and method by which the spheres are processed can be varied in accordance with the present invention. In one embodiment, all of the parallel circles forming a single sphere about a center point are created, and the discrete locations falling within all of those circles are associated with that center point. The entire process is repeated for each successive center point until the spheres formed around all of the center points have the same radius. Thus, each sphere about each center point is fully formed in three-dimensions before the processing proceeds to the next center point. In another embodiment, the circle processing for all of the center points is performed in a single plane. After all of the circles about each center point in that plane are processed, the circle-creating process is repeated in a parallel plane.

The CLUT value associations for all of the discrete locations in the color cube may be stored in a three-dimensional array. In one embodiment of the present invention, the CLUT value associations are stored in a three-dimensional array of "short" variables, which are two-byte integer variables, and this array is additionally used in conjunction with an image dithering function. For a 24-bit color image, the three-dimensional array would be a 256×256×256 array, wherein each entry includes an eight-bit upper byte containing the CLUT value association and an eight-bit lower byte containing a set of bit flags as will be described in the example below.

The first bit in the eight-bit lower byte is an association value which identifies whether the color cube location has already been associated with one of the expanding spheres. A "0" value indicates that the discrete location has not yet been associated with any CLUT entry, and a "1" value indicates that an association has already been established.

The second bit is an edge detection value and marks discrete locations corresponding to color values selected using an edge detection algorithm on the original image. This edge detection algorithm determines which pixels reside along the edge of a color change in an image and gives those colors a priority for display. This algorithm is used during the initial volume selection process to help preserve colors used to describe image detail.

The next two bits are dithering values are used for marking the location as a candidate for a color dithering function. Numerous techniques for color dithering are known for improving the quality of a displayed image using digital halftoning. In accordance with this embodiment, these two bits are used to identify which locations will be subject to dithering in the final displayed image. A "11" indicates that the location is a center point, and therefore would not be available for dithering. A "00" indicates that a particular location is not available for dithering, and a "01" indicates that the location is available for dithering. Finally, a "10" indicates that the location is available for dithering if the distance from the location to the center point of the sphere containing that location is greater than a certain value. This minimum distance value is contained within the final four bits in the lower byte. Requiring that a discrete location be a minimum distance from the center point before it is made available for dithering allows the dithering process to be limited to large spheres, where the need for dithering may be the greatest.

This three-dimensional array is illustrated in tabular form in FIG. 3a. In this embodiment, each discrete location 12 is identified by a 24-bit value, listed in FIG. 3a in the "Discrete Location" column. Corresponding to each discrete location is a "Mapping Value" stored in the upper eight bits of the short variable. This mapping value is an 8-bit value corresponding to one of the 256 entries in the color look-up table, shown in FIG. 3b. Each of the CLUT entries in FIG. 3b is associated with one of the volume center points, and the color of that volume center is stored as a 24-bit value in the "Display Color" column of the CLUT. As the sphere-creating process proceeds and discrete locations are associated with one of the CLUT entries, that CLUT entry value is stored as a mapping value corresponding to that discrete location. The third column in FIG. 3a stores bit flags for each discrete location, as described above.

After all of the discrete locations in the color cube are mapped to exactly one of the CLUT values, the colors in the bitmap image to be converted are processed using the CLUT value associations. Each pixel in the input bitmap image contains a true color value which corresponds to a location on the color cube. As described above, this true color value may be represented by a 24-bit color value. This true color value is replaced with the CLUT mapping value corresponding to the associated volume center point. The CLUT value may, for example, be an 8-bit CLUT mapping value identifying one of the 256 values in the CLUT.

When the bitmap image is displayed on a raster screen, the CLUT and the 8-bit color values are loaded into the video processor. The image bitmap is then output and displayed using only the colors present in the CLUT. Where an 8-bit value is used for the CLUT mapping value, as described above, a total of 256 unique colors can be used to display the image. This image may be further augmented using a dithering process in conjunction with the dithering value stored in the memory array as described above.

Figure 4:
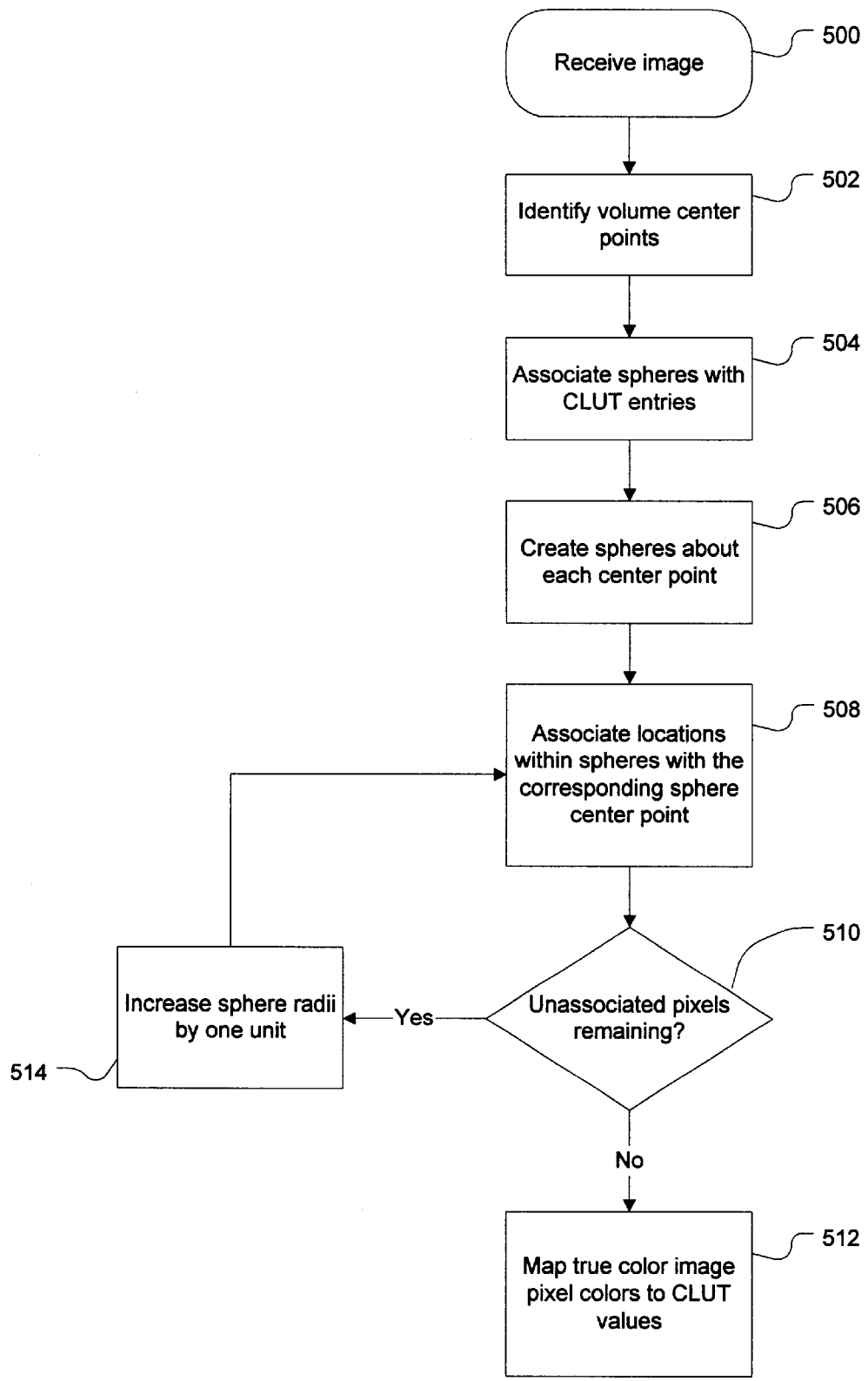
FIG. 4 a flowchart of a color conversion process in accordance with the present invention.

FIG. 4 is a flowchart showing the color conversion process described above. In step 500, a digital image is received. In step 502, a plurality of volume center points are identified in a three-dimensional color cube. In step 504, spheres are associated with each CLUT entry. In 506, these spheres are created about the center of each volume. In step 508, all of the locations falling within each sphere is associated with the CLUT entry corresponding to the center point of that sphere. In 510, a determination is made as to whether unassociated pixels still remain in the image. If so, then each of the spheres are increased in size in step 514, and step 508 is repeated. If no other unassociated pixels remain, then all of the true color pixels from the original image may be mapped to the CLUT table in step 512. This color conversion process reduces a raster image data file from n possible colors for each pixel (n being the total number of discrete locations within the color cube) to m total colors in the output data file (m being the number of colors in the CLUT). Typically, $n=2^{24}$ for a 24-bit true color image and m=256 for an 8-bit frame buffer system. However, the conversion process in accordance with the present invention may be generalized to any set of values for n>m>1.

Figure 5:
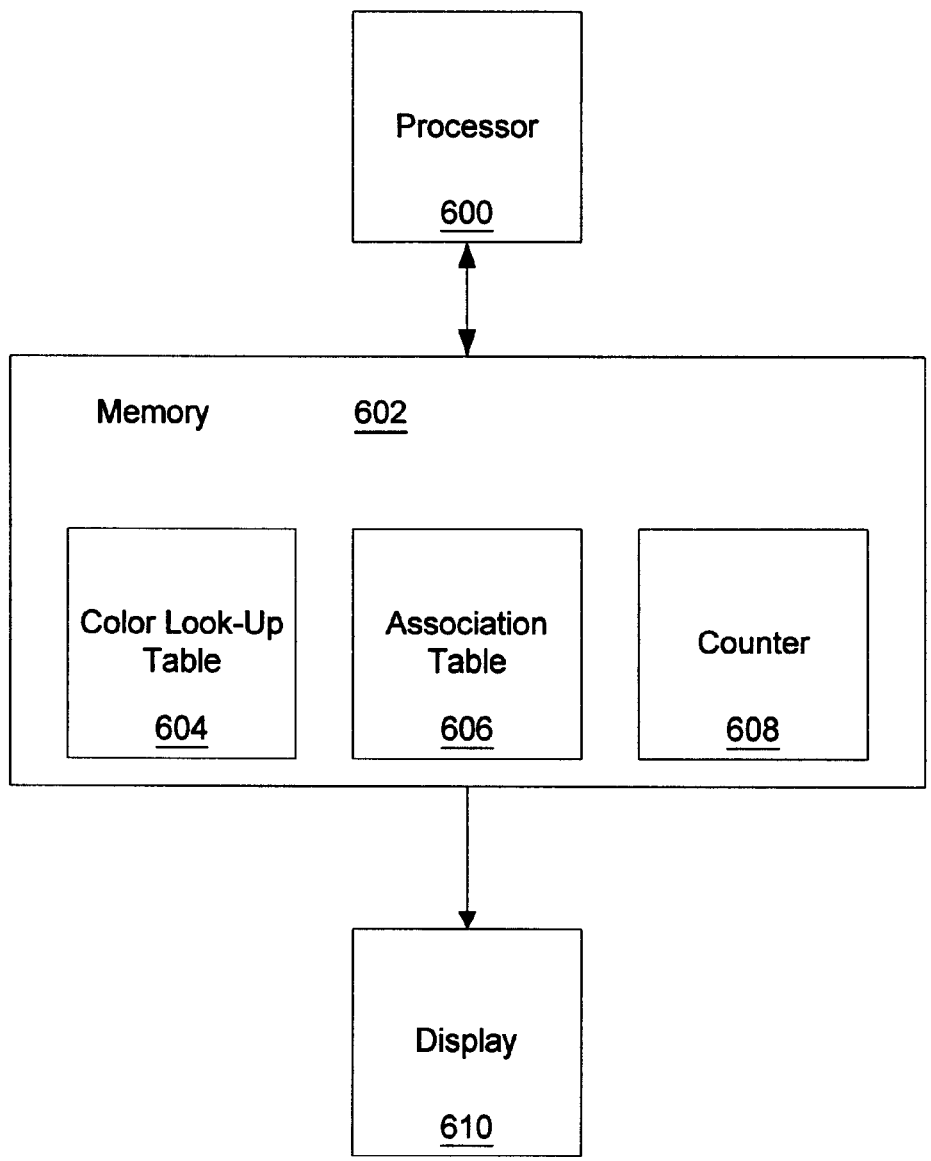
FIG. 5 is a block diagram of a computer system in accordance with the present invention.

FIG. 5 shows a block diagram of a computer system implementing a color conversion process in accordance with the present invention. A processor 600 is connected with a memory 602, which contains a CLUT 604, association table 606, and counter 608. CLUT 604 includes entries for each of its indices and their respective true colors. Association table 606 includes entries for all of the discrete locations in color cube 1, as well as their CLUT mappings. Alternatively, association table 606 may be reduced to only include entries for the pixels that actually exist in the image to be converted, which is likely to be considerably less than the $2^{24}$ discrete locations that exist in the color cube. Counter 608 may be used to keep track of the unassociated discrete locations remaining as the sphere-creating process proceeds. Finally, the converted image is displayed on display 610.

Although the invention has been described with reference to particular embodiments, the description is only an example of the invention's application and should not be taken as a limitation. In particular, even though the circle-creating process described used radius increments of one unit equal to the width of a single discrete location 12, alternative embodiments of this invention may use increasing radii of various lengths. In addition, the color conversion process is not limited to the conversion of 24-bit images to 8-bit images; any size image can be reduced to any size color palette. Various other adaptations and combinations of features of the embodiments disclosed are within the scope of the invention as defined by the following claims.

I claim:

1. A method for color conversion using a three-dimensional color cube, each axis of the color cube representing a variable in a color model, in which the color cube defines n discrete locations each having a color the method comprising:

determining m center points in said color cube, n being less than n;

performing a sphere-creating process comprising:
creating a plurality of spheres, each sphere being centered on a corresponding one of said center points and having a radius R;
identifying all discrete locations located within each sphere; and
associating each identified discrete location with the center point of the sphere within which that discrete location is located; and iteratively performing said sphere-creating process, wherein each iteration uses spheres of a radius incrementally larger than the radius in the preceding iteration, and for each identified discrete location not already associated with one of said center points associating said identified discrete location to the center point corresponding to the incrementally larger sphere within which said identified discrete location is located, wherein said sphere-creating process is repeated until all discrete locations have an associated center point.

2. The method of claim 1, wherein said sphere-creating process comprises:
beginning said sphere-creating process using R equal to a width of one of said discrete locations; and
each iteration of said sphere-creating process uses a value of R increased by an amount equal to the width of one of said discrete locations.

3. The method of claim 1, further comprising:
maintaining a counter of memory locations not yet associated with one of said center points, said iterations of the sphere-creating process repeating until said counter of memory locations reaches 0.

4. The method of claim 1, further comprising:
associating each center point with an entry in a color look-up table;
wherein said associating each identified discrete location with the center point of the sphere within which that discrete location is located comprises assigning to each identified discrete location a mapping value corresponding to the color look-up table entry corresponding to the center point of the sphere within which each identified discrete location is located.

5. The method of claim 4, further comprising:
creating a data structure containing a memory location for each discrete location in said color cube; and
storing each of said mapping values in the memory location corresponding to the discrete location to which said mapping value is assigned.

6. The method of claim 5, further comprising storing in said data structure an association value for each discrete location, said association value indicating whether the corresponding discrete location has been associated with one of said center points.

7. The method of claim 5, further comprising storing in said data structure a dithering value for each discrete location, said dithering value indicating whether the corresponding discrete location is a candidate for color dithering.

8. The method of claim 7, wherein said associating each identified discrete location with the center point of the sphere within which that discrete location is located further comprises:
determining a distance from each identified discrete location to the center point of the sphere within which said identified discrete location is located; and
if said distance is greater than a minimum dithering distance, setting said dithering value to indicate that said identified discrete location is a candidate for color dithering, and if said distance is less than said minimum dithering distance, setting said dithering value to indicate that said identified discrete location is not a candidate for color dithering.

9. The method of claim 1, wherein said determining said plurality of center points comprises:
dividing said color cube into a plurality of bins each having a subset of said n discrete locations;
determining a color center for each of said plurality of bins, said color center comprising the center point;
assigning each color center to a mapping value in a color look-up table.

10. The method of claim 1, wherein n is $2^{24}$.

11. The method of claim 1, wherein m is 256.

12. A method for color conversion of a digital image on a computer, comprising:
providing a data structure representing a three-dimensional color cube, each axis of the color cube representing a variable in a color model, said color cube defining a plurality of discrete locations;

determining a plurality of center points in said color cube;

associating each of said plurality of center points with an entry in a color look-up table;

storing a color value for each of said plurality of center points in the color look-up table entry corresponding to said center point;

performing a sphere-creating process on said computer said sphere-creating process comprising:

creating a sphere having a radius R about each center point said sphere comprised of a plurality of circles drawn in parallel planes in said color cube;

for each sphere, identifying all discrete locations located within said plurality of circles within each sphere;

associating each identified discrete location with the center point of the circle containing said identified discrete location, said associating comprising assigning a mapping value of the color look-up table entry corresponding to said center point to a memory location in said data structure corresponding to said identified discrete location; and iteratively performing said sphere-creating process, wherein each iteration uses spheres of a radius incrementally larger than the radius in the preceding iteration, and for each identified discrete location not already associated with one of said center points, associating said identified discrete location to the center point corresponding to the incrementally larger sphere within which said identified discrete location is located, wherein said sphere-creating process is repeated until all discrete locations have an associated center point.

13. The method of claim 12, wherein said sphere-creating process comprises:

beginning said sphere-creating process using R equal to a width of one of said discrete locations; and each iteration of said sphere-creating process uses a value of R increased by an amount equal to the width of one of said discrete locations.

14. The method of claim 12, further comprising:

maintaining a counter of memory locations not yet associated with one of said plurality of index points, said iterations of the sphere-creating process repeating until said counter of memory locations reaches 0.

15. The method of claim 12, further comprising storing in said data structure an association value for each discrete location, said association value indicating whether the corresponding discrete location has been associated with one of said center points.

16. The method of claim 12, further comprising storing in said data structure a dithering value for each discrete location, said dithering value indicating whether the corresponding discrete location is a candidate for color dithering.

17. The method of claim 12, wherein said associating each identified discrete location with the center point of the circle containing said identified discrete location comprises:

determining a distance from each identified discrete location to the center point of the circle within which said identified discrete location is located; and if said distance is greater than a minimum dithering distance, setting said dithering value to indicate that said identified discrete location is a candidate for color dithering, and if said distance is less than said minimum dithering distance, setting said dithering value to indicate that said identified discrete location is not a candidate for color dithering.

* * * * *

UNITED STATES PATENT AND TRADEMARK OFFICE
CERTIFICATE OF CORRECTION

PATENT NO.    : 6,618,500 B1                                            Page 1 of 1
DATED         : September 9, 2003
INVENTOR(S)   : Thomas Patrick Dawson It is certified that error appears in the above-identified patent and that said Letters Patent is hereby corrected as shown below:

Column 3,
Line 40, after "FIG. 4," insert -- is --.

Column 4,
Line 64, change "an center point" to -- a center point --.

Column 6,
Line 44, change "the order in the" to -- the order in which the --.
Line 63, change "color cube I" to -- color cube 1 --.

Column 7,
Line 16, after "be" change "filed" to -- filled --.

Column 8,
Line 1, after "values", delete "are".

Column 9,
Line 44, between "color" and "the" insert -- , --.
Line 46, change "n being less than n" to -- m being less than n --.

Column 11,
Line 13, between "point" and "said", insert -- , --.

Signed and Sealed this

Thirtieth Day of December, 2003

JAMES E. ROGAN
*Director of the United States Patent and Trademark Office*